United States Patent

Fridman et al.

[15] 3,649,919

[45] Mar. 14, 1972

[54] WIDEBAND FM DEMODULATOR

[72] Inventors: Jonathan D. Fridman, Sudbury; Kenneth F. Kinnard, Lexington; Kurt A. Meister, Framingham; Robert M. Young, Newton, all of Mass.

[73] Assignee: Raytheon Company, Lexington, Mass.

[22] Filed: Oct. 8, 1969

[21] Appl. No.: 864,821

[52] U.S. Cl. ..............................325/346, 325/349, 325/418, 329/122

[51] Int. Cl. ..............................H03d 3/02

[58] Field of Search ..................325/345, 346, 349, 418, 419, 325/421, 430, 438, 487; 329/50, 122, 179

[56] References Cited

UNITED STATES PATENTS

| | | | |
|---|---|---|---|
| 2,362,000 | 11/1944 | Tunick | 325/46 X |
| 3,231,822 | 1/1966 | Tillotson | 325/346 |
| 3,308,379 | 3/1967 | Leyseiffer et al. | 325/421 X |
| 3,328,583 | 6/1967 | Davison | 325/421 X |
| 3,346,815 | 10/1967 | Haggai | 325/419 X |

*Primary Examiner*—Benedict V. Safourek
*Attorney*—Philip J. McFarland and Joseph D. Pannone

[57] ABSTRACT

A demodulator for frequency modulated radio frequency signals adapted to produce a DC signal indicative of the average frequency of such a signal and an AC signal indicative of the frequency deviation thereof. Such demodulator including a reference signal oscillator and a voltage controlled oscillator feeding a mixer to produce a difference frequency signal serving as a local oscillator signal to beat with the frequency modulated radio frequency signals being demodulated. The frequency of the signal out of the voltage controlled oscillator is controlled so that the beat frequency signal out of the mixer varies with changes in the frequency of the frequency modulated radio frequency signal being demodulated. The DC component of the control signal to the voltage controlled oscillator then is indicative of the average frequency of the frequency modulated radio frequency signals being demodulated and the variations in such control signal is indicative of the frequency deviation thereof.

1 Claims, 1 Drawing Figure

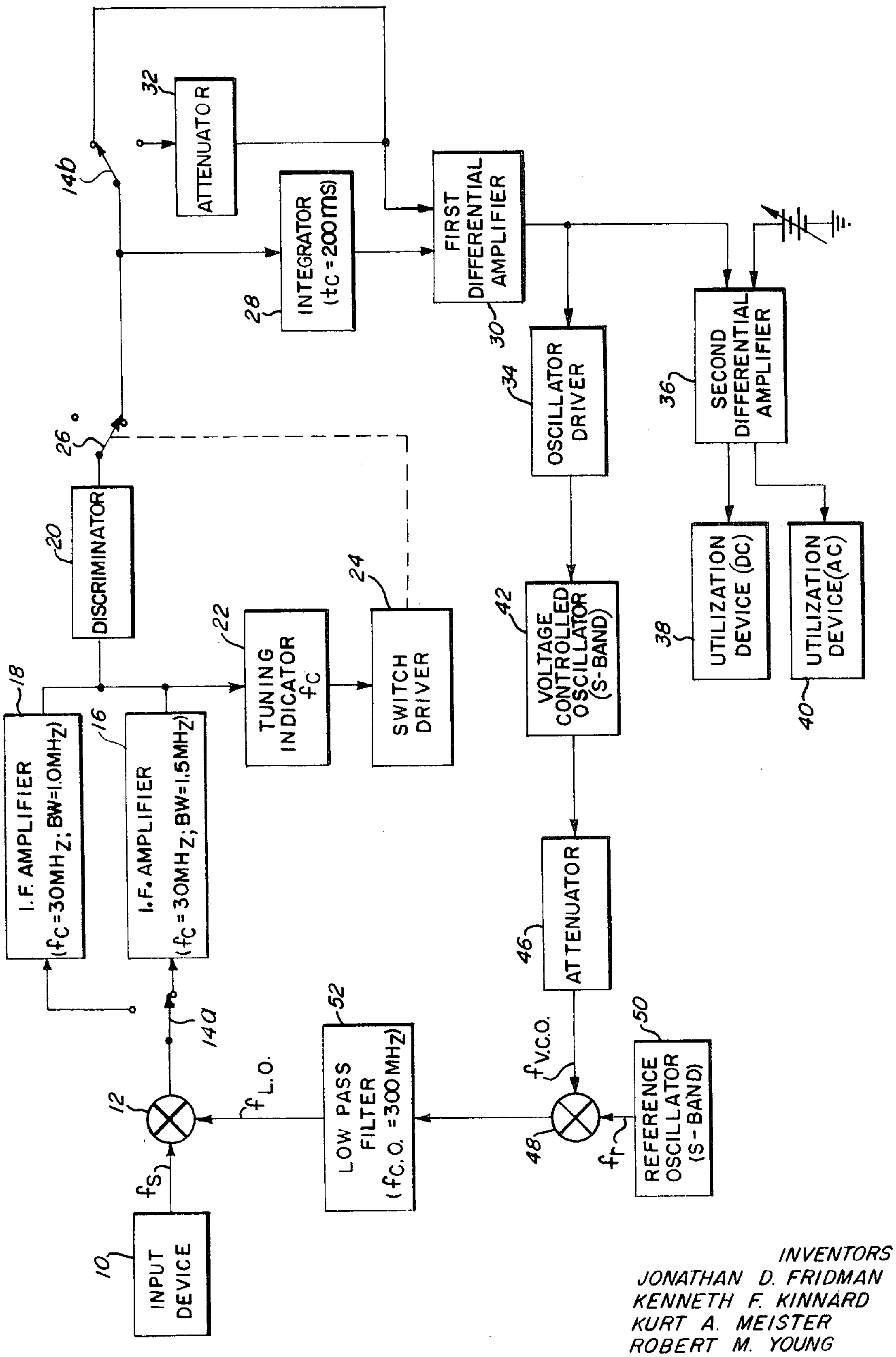
INVENTORS
JONATHAN D. FRIDMAN
KENNETH F. KINNARD
KURT A. MEISTER
ROBERT M. YOUNG

WIDEBAND FM DEMODULATOR

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

This invention pertains generally to circuitry for demodulating frequency modulated radio frequency signals and particularly to circuitry of such nature which is adapted to follow large and rapidly varying modulating signals.

It is known in the art that many types of frequency modulated radio frequency signals may be demodulated by heterodyning any such signal with a similarly modulated local oscillator signal, amplifying the resulting intermediate frequency signal and applying such amplified signal to a detector, as a discriminator. It is also known in the art that performance of a circuit as just outlined may be improved by "narrow-banding" the intermediate frequency amplifier to minimize the effect of noise signals on the demodulation process. Thus, it is quite common in the art to modulate the frequency of the local oscillator in accordance with variations in the output signal from the detector, thereby maintaining the difference between the frequency of such oscillator and the radio frequency signal to be demodulated at a minimum value.

In certain applications of optical radar (as when the doppler shift of reflected light varies in accordance with the instantaneous velocity, hence the flow and turbulence of the gas in such a stream) it is essential that a demodulator be provided which will respond to both the instantaneous doppler shift (representing turbulence) and the mean doppler shift (representing average velocity). In this kind of an application, it is evident, considering the nature of turbulence, that a satisfactory demodulator be capable of operating on randomly varying signals changing at high rates. The nature of such an application is such that, in addition, it requires a demodulator that can demodulate a signal of variable carrier frequency. Further, the nature of the turbulence process in such an application generates a power spectrum that contains frequency modulated signals identified by deviation frequencies and modulation indices representative of the motion of turbulent vortices within the flow.

Therefore, it is a primary object of this invention to provide an improved demodulator for frequency modulated radio frequency signals, such demodulator being adapted to operate on signals having a large modulation index;

Another object of this invention is to provide a demodulator for frequency modulated radio frequency signals in which the modulating signals may vary systematically or randomly at relatively high rates;

Still another object of this invention is to provide a demodulator for frequency modulated radio frequency signals of a composite nature, meaning signals on which more than one modulating signal is impressed. That is, the demodulator must respond to the power spectrum of the input signal, distributed over a wide range of the modulation index.

SUMMARY OF THE INVENTION

These and other objects of this invention are attained generally by providing, for a demodulator, a control circuit and local oscillator circuit which together operate to follow faithfully the excursions of any frequency modulated radio frequency signal with a wide spectrum of frequencies and, as a result, permit such a signal to be heterodyned into a relatively narrow band intermediate frequency signal.

BRIEF DESCRIPTION OF THE DRAWINGS

For a more complete understanding of this invention, reference is now made to the following description of a preferred embodiment and to the drawing, in which:

the FIGURE is a block diagram of a demodulator according to this invention.

DESCRIPTION OF THE PREFERRED EMBODIMENT

Referring now to the FIGURE, it may be seen that in the preferred embodiment of this invention an input signal, $f_s$, from an input device 10 is applied to a first mixer 12 wherein it is heterodyned with a local oscillator signal, $f_{L.o.}$, to produce an intermediate frequency signal (not numbered). The input signal, $f_s$, here is a composite signal consisting of: (a) a carrier whose frequency may vary from 5 MHz through 200 MHz; (b) a modulating signal (also sometimes referred to hereinafter as the baseband signal) whose frequency may vary from 0 to 100 kHz. and which results in frequency deviations of 0 to 50 percent of the frequency of the carrier up to a limit of 30 MHz. Such a composite signal may be derived, for example, from an optical radar system when used in measuring the average rate of flow and turbulence of a gas stream. Because the signal generating portion of such a system is not, however, deemed to be a part of this invention, it is represented here as the input device 10.

The intermediate frequency signal out of mixer 12 is fed through a switch **14*a* to either one of a pair of intermediate frequency amplifiers 16, 18 and then to a conventional discriminator 20. Each one of the intermediate frequency amplifiers 16, 18 has a center pass frequency, $f_c$, of 30 MHz, the difference between the two being that intermediate amplifier 16 has a bandwidth of 1.5 MHz and intermediate amplifier 18** has a bandwidth of 1.0 MHz.

For reasons which will become clear hereinafter, the output of the connected one of the intermediate frequency amplifiers 16, 18 is also connected to a tuning indicator 22. This element may include an amplitude detector of conventional construction to produce a signal when an intermediate frequency signal is present at the output of the actuated one of the intermediate amplifiers 16, 18. When such a condition obtains, a switch driver 24 (which also is of conventional construction) is actuated to move a switch 26 into its illustrated position, thereby to connect the output of the discriminator 20 to the remaining portions of the circuit. The signal out of the discriminator 20 is applied through an integrator 28 and a switch **14*b* to a first differential amplifier 30 (when switch 14*b* is in its illustrated position). It will be noted here that switches 14*a* and 14*b* are ganged and may be manually operable. It follows, when such switches are moved to their alternate positions, that intermediate frequency amplifier 16 is disconnected from the signal path and intermediate frequency amplifier 18 is connected to such path and that a portion of the output signal from the discriminator 20 is passed through an attenuator 32 before being applied to the first differential amplifier 30. While any known type of integrator may be used, it is here preferred that it include an operational amplifier, as a Type 142C Operational Amplifier by Analog Device, Cambridge, Massachusetts, connected in a conventional manner so as to act as an integrator having a time constant of approximately 200 milliseconds. In brief, such an amplifier is characterized by an extremely high DC and low frequency gain, so that the input signal required for full output is generally negligible, both in current and in voltage. Such an amplifier is also characterized by low closed-loop output impedance, and by a fairly uniform roll-off in gain with frequency over many decades. Being a FET (field effect transistor) input amplifier, it has an extremely high input impedance which minimizes loading of the driving circuitry. In addition, such an amplifier has a unity gain bandwidth of approximately 5 MHz. Similarly, while any type of differential amplifier may be used, it is here preferred that the first differential amplifier 30 be an operational amplifier of the same type as the amplifier in the integrator 28**.

The signal out of the first differential amplifier 30 is connected as shown to an oscillator driver 34 and a second differential amplifier 36. The oscillator driver 34 is preferably a conventional emitter amplifier and the second differential amplifier 36 is the same as the first differential amplifier 30. The signal out of the second differential amplifier 36 is connected to a utilization device (DC) 38, as a D'Arsonval instrument, and a utilization device (AC) 40, also a D'Arsonval instrument.

A moment's thought will make it clear that other types of utilization devices may be used. For example, if it is desired to record either the DC or the AC output of the differential amplifier 36 appropriate recording devices could be utilized.

The signal out of the oscillator driver 34 is passed to a voltage controlled oscillator (S-band) 42 as shown. The output of the latter inturn is passed through an attenuator 46 to a second mixer 48. In passing, it should be noted that the voltage controlled oscillator here preferred to be used is a type FS–14B of Frequency Sources, North Chelmsford, Massachusetts. Such a voltage controlled oscillator is, for instance, tunable over a frequency band 2,900 MHz to 3,300 MHz by a tuning voltage of 36 volts to 22 volts, at an extremely fast rate exceeding 1 MHz. It is characterized by an approximately linear frequency versus voltage curve. The output power is approximately 300 milliwatts over the full range.

The second input to the second mixer 48 is derived from a reference oscillator (S-band) 50, which may be a stable oscillator of conventional construction to operate with the voltage controlled oscillator (S-band) 42. The heterodyne signals out of the second mixer 48 are passed through a low pass filter 52 back to the first mixer 12.

The operation of the described circuit will now be explained, it being understood that appropriate power supplies (not shown) have been connected to energize the various active elements of the disclosed circuit, that the switches 14*a*, 14*b* are in the positions shown, and the switch 26 is in its alternate position. Thus, when an input signal, $f_s$, is impressed on the first mixer 12, such signal is heterodyned with the local oscillator signal $f_{L.O.}$. In the ordinary situation, it will be observed that none of the resulting heterodyne signals out of the first mixer 12 are within the bandwidth of the intermediate frequency amplifier 16. Consequently, that amplifier acts as a rejection filter preventing signals from being impressed on either the discriminator 20 or the tuning indicator 22. It is necessary, therefore, to change the local oscillator frequency, $f_{L.O.}$, until the proper one of the heterodyne signals out of the first mixer 12, i.e., an intermediate frequency signal having a frequency of 30±0.75 MHz, is impressed on intermediate frequency amplifier 16. The proper one of the heterodyne signals out of the first mixer 12 is here found decreasing the local oscillator frequency, $f_{L.O.}$, from its maximum value, 300 MHz, until the tuning indicator 22 indicates a maximum signal out of the intermediate frequency amplifier 16. When this condition obtains, the switch driver 24 operates to cause switch 26 to move to its illustrated position. On movement of switch 26, the output signal from the discriminator 20 is connected, via switch 14*b*, to one input terminal of the first differential amplifier 30 and, through integrator 28, to the second input terminal of the same amplifier. The character of the output signal from discriminator 20 depends, of course, on the character of the modulating signal on the input signal, $f_s$. If, for example, such signal includes a slowly varying carrier frequency, the effect of the integrator 28 is to vary the output of the voltage controlled oscillator (S-band) 42 to follow this slowly varying signal. If, on the other hand, the signal contains a rapidly varying component, the effect of the integrator 28 is negligible and the voltage controlled oscillator (S-band) 42 follows the instantaneous changes in the signal. The amplitude of the output signal from the first differential amplifier 30, therefore, follows both varying components of the input signal thereto. Such output signal, upon being amplified and inverted in the oscillator driver 34, is applied to the voltage controlled oscillator (S-band) 42, causing that element to change its output frequency in the direction tending, as will be seen, to eliminate the variable component. The signal out of the voltage controlled oscillator (S-band) 42, of frequency $f_{V.C.O.}$, passes through attenuator 46 and is heterodyned in the second mixer 48 with the signal, $f_r$, from the reference oscillator (S-band) 50, to produce heterodyne signals. All but the lowest, i.e., below 300 MHz, of these signals are rejected by the low pass filter 52, leaving a "pure" local oscillator signal, $f_{L.O.}$, to be applied to the first mixer 12. It should be noted here that the concept of beating two S-band signals, one of which is substantially constant and the other of which may vary by about 1 percent, produces a local oscillator signal in a desired band which may vary by almost 100 percent. The result of performing such an intermediate heterodyne process, is to extend the track and slew rates of the demodulator to rates, for instance, of $10^{14}$ Hz./sec.

As long as the intermediate frequency signal out of the first mixer 12 differs from the center frequency, $f_c$, of the intermediate frequency amplifier 16, there is a constant, or slowly changing, component in the output signal from the discriminator 20. Such component is effective to vary the operating point of the first differential amplifier 30. As a result, then, the output signal therefrom varies about an average value, which results in the frequency of the voltage controlled oscillator (S-band) 42 changing to force the local oscillator frequency, $f_{L.O.}$, to eliminate the varying component from the output signal from the discriminator 20.

It will be observed that the change in the operating point of the first differential amplifier 30, required to eliminate any slowly varying component from the output signal from the discriminator 20, is analogous to such component. Therefore, measurement of the change in the operating point of the first differential amplifier corresponds to a measurement of the slowly varying component in the input signal, $f_s$. Although the measurement of the change in the operating point of the first differential amplifier 30 may be accomplished in many ways, it is here chosen to feed a portion of the output signal from the first differential amplifier 30 into one input terminal of the second differential amplifier 36, with the second input terminal of the latter being energized from a voltage source (not numbered), and connecting the utilization device (DC) 38 directly to an output terminal, as shown. The rapidly varying component of the output signal from the discriminator 20, which is analogous to the rate of change of the input signal, $f_s$, is an AC signal impressed on the second differential amplifier 36 and may, in any convenient way not shown, be separated from the DC component and impressed on the utilization device (AC) 40.

When it is known that the modulating signals on the input signal, $f_s$, are relatively small, switches 14*a*, 14*b* may be moved to their alternate positions. Such movement, then, puts the intermediate frequency amplifier 18 in circuit and connects the output of the discriminator 20 through the attenuator 32. The described embodiment, however, operates in the manner described above, the difference being that because the bandwidth of the intermediate amplifier 18 is narrower than the bandwidth of the intermediate amplifier 16, a portion of any noise signals present at the output of the first mixer 12 (which obviously would pass through the intermediate amplifier 16) is rejected. Such rejection increases the signal-to-noise ratio to make the operation of the complete circuit more dependable. The attenuator 32 simply reduces the rapidly varying component of the signal into the first differential amplifier 30.

Having described a preferred embodiment of this invention and the operation of such embodiment, it is felt that many changes herein will be apparent to those of skill in the art. For example, it is not necessary to use the illustrated elements to operate the disclosed circuit in more than one mode. It is evident that the change in bandwidth of the intermediate frequency amplifier and gain may be effected in many other ways to obtain optimum performance as the spectrum of the input signal changes. Further, although the illustrated embodiment has been described as operating with a continuous wave carrier signal, it is equally feasible to use the circuit with an interrupted carrier, or pulse, signal.

It is felt, therefore, that this invention should not be restricted to the disclosed embodiment but rather should be limited only by the spirit and scope of the appended claims.

What is claimed is:

1. A demodulator for a frequency modulated radio frequency signal, such signal having a carrier frequency signal and a modulating signal randomly varying in frequency, such demodulator comprising:

a. a mixer, responsive to a frequency modulated radio frequency signal to be demodulated and a local oscillator signal, for producing an intermediate frequency signal;

b. oscillator means for producing the local oscillator signal applied to the mixer, such oscillator means including:

i. a stable oscillator and voltage controlled oscillator, the frequency of operation of such stable oscillator and such voltage controlled oscillator being greater than the frequency of the frequency modulated radio frequency signal to be demodulated; and ii. heterodyning means, responsive to the output signal of the stable oscillator and to the output signal of the voltage controlled oscillator, for producing a difference frequency signal, such difference frequency signal being the local oscillator signal applied to the mixer; and c. control signal generating means, responsive to the intermediate frequency signal out of the mixer, for producing a control signal for the voltage controlled oscillator, the amplitude of such control signal varying in accordance with changes in frequency of the modulating signal whereby the frequency of the output signal of the voltage controlled oscillator similarly varies, thereby causing the difference frequency signal and the frequency modulated radio frequency signal to be demodulated to produce, out of the mixer, the intermediate frequency signal, such control signal generating means including:

i. an intermediate frequency amplifier, responsive to the intermediate frequency signal out of the mixer, for amplifying such signal;

ii. a discriminator, responsive to the amplified intermediate frequency amplifier, for producing an amplitude varying signal in accordance with changes in frequency of the signal out of the intermediate frequency amplifier;

iii. integrating means, responsive to the amplitude varying signal out of the discriminator, for producing an average signal indicative of the carrier frequency signal in the frequency modulated radio frequency signal; and iv. a differential amplifier, responsive to the amplitude varying signal out of the discriminator and to the average signal out of the integrating means, for producing the control signal for the voltage controlled oscillator.

* * * * *